US009197763B2

(12) United States Patent
Baker et al.

(10) Patent No.: US 9,197,763 B2
(45) Date of Patent: Nov. 24, 2015

(54) OVERLAYING DATA IN AN AUGMENTED REALITY USER INTERFACE

(76) Inventors: Josh Baker, Scottsdale, AZ (US); Frank Craig Prichard, Scottsdale, AZ (US)

( * ) Notice: Subject to any disclaimer, the term of this patent is extended or adjusted under 35 U.S.C. 154(b) by 873 days.

(21) Appl. No.: 12/940,082

(22) Filed: Nov. 5, 2010

(65) Prior Publication Data

US 2012/0113285 A1    May 10, 2012

(51) Int. Cl.
*H04N 5/228* (2006.01)
*H04N 1/00* (2006.01)

(52) U.S. Cl.
CPC ......... *H04N 1/00127* (2013.01); *H04N 1/0044* (2013.01); *H04N 2201/3253* (2013.01)

(58) Field of Classification Search
CPC ............ H04N 1/00127; H04N 1/0044; H04N 2201/3253
USPC .............. 348/222.1, 333.99, 207.99; 345/633
See application file for complete search history.

(56) References Cited

U.S. PATENT DOCUMENTS

| | | | |
|---|---|---|---|
| 6,520,864 B1 * | 2/2003 | Wilk .............................. 473/152 |
| 7,239,269 B2 * | 7/2007 | Nozawa .................... 342/357.57 |
| 2004/0070691 A1 * | 4/2004 | Kojima et al. ................ 348/601 |
| 2007/0135237 A1 * | 6/2007 | Reeves .......................... 473/407 |
| 2007/0209017 A1 * | 9/2007 | Gupta et al. ................... 715/781 |
| 2007/0268392 A1 * | 11/2007 | Paalasmaa et al. ...... 348/333.02 |
| 2009/0075761 A1 * | 3/2009 | Balardeta et al. ............. 473/407 |
| 2009/0082139 A1 * | 3/2009 | Hart .............................. 473/407 |
| 2009/0305820 A1 * | 12/2009 | Denton et al. ................ 473/407 |
| 2010/0045869 A1 * | 2/2010 | Baseley et al. ............... 348/598 |
| 2010/0174480 A1 * | 7/2010 | Trenkle et al. ................ 701/201 |
| 2011/0022314 A1 * | 1/2011 | Balardeta et al. ............. 701/213 |
| 2011/0216179 A1 * | 9/2011 | Dialameh et al. .............. 348/62 |
| 2012/0007885 A1 * | 1/2012 | Huston .......................... 345/633 |

* cited by examiner

*Primary Examiner* — Roberto Velez
*Assistant Examiner* — Tuan Le

(57) ABSTRACT

Disclosed are various embodiments for overlaying data in an augmented reality user interface. A camera associated with a mobile device is accessed and activated, and a location associated with the mobile device is detected. A direction in which the camera is pointed is detected and video captured by the camera displayed. Indicators associated with points of interest on a golf course are overlaid on the video in a user interface.

18 Claims, 8 Drawing Sheets

OVERLAYING DATA IN AN AUGMENTED REALITY USER INTERFACE

BACKGROUND

In the game of golf, a player often utilizes various pieces of information to improve his/her score. As a non-limiting example, during a round, a player may utilize yardages to a green, to a hazard, and/or to a lay up position. Similarly, a player may also utilize statistical data from a round to determine strengths and weaknesses in his/her game. As this data may be difficult to accurately determine and present to a user, a user may be left at a disadvantage.

SUMMARY

Included are systems and methods for overlaying data in an augmented reality user interface in a mobile device. At least one embodiment of a method includes accessing a camera in communication with the mobile device; activating at least one video capture capability of the camera; determining a location associated with the mobile device; determining a direction in which the camera is pointed; displaying, in a display associated with the mobile device, video captured by the camera in a user interface; and overlaying at least one indicator associated with at least one predetermined point of interest on the video in the user interface.

Also included are embodiments of a system. At least one embodiment of the system includes means for accessing a camera; means for activating at least one video capture capability of the camera; means for determining a location; means for determining a direction in which the camera is pointed; means for displaying video captured by the camera; and means for overlaying at least one indicator associated with at least one predetermined point of interest on the video.

Also included are embodiments of a non-transitory computer readable medium executable in a mobile device. At least one embodiment includes logic that accesses, in the mobile device, a camera in communication with the mobile device; logic that activates, in the mobile device, at least one video capture capability of the camera; logic that determines, in the mobile device, a location associated with the mobile device; logic that determines, in the mobile device, a direction in which the camera is pointed; logic that displays, in a display associated with the mobile device, video captured by the camera in a user interface; and logic that overlays, in the mobile device, at least one indicator associated with at least one predetermined point of interest on the video in the user interface.

Other systems, methods, features, and advantages of this disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
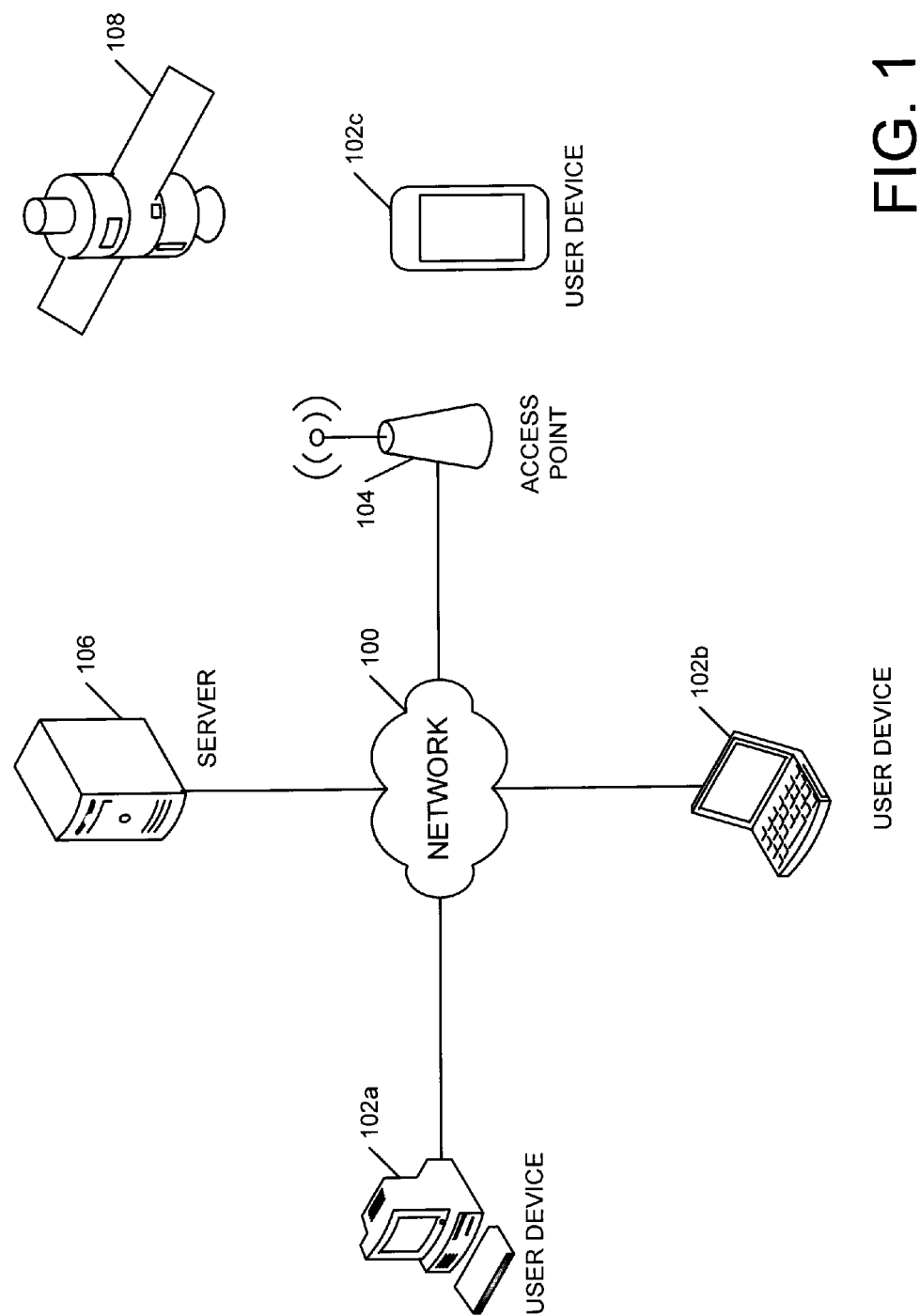
FIG. 1 is a drawing of a networked environment including user devices according to various embodiments of the present disclosure.

In the following discussion, a general description of the system and its components is provided, followed by a discussion of the operation of the same. Embodiments disclosed herein include a system and/or method that utilize global positioning and/or other positioning system capabilities of a mobile device for use by a golfer on a golf course. Embodiments disclosed herein can further take advantage of compasses, accelerometers, gyroscopes, and/or other motion sensing capabilities of the mobile device to provide position specific information about a golf course to a golfer. More specifically, by utilizing position data from the mobile device, embodiments disclosed herein may be configured to provide segment lines for lay up shots; provide dynamic lay up positions; provide touch point positions; and/or provide statistical information in a user interface.

At least one non-limiting example may include a mobile device or user device, such as a cellular telephone, personal digital assistant, iphone™, itouch™, ipod™, Blackberry™, devices running Android™, iOS™, WebOS™, and/or Windows Phone™ operating systems, or other devices or operating systems as can be appreciated. The mobile device may be configured with global positioning hardware, as well as software for determining a user's global position with reference to a golf course. Embodiments may also be configured to access satellite and/or other images (or video) associated with the determined global position. Additionally, the device can be configured with compasses, gyroscopes, accelerometers, or other motion or direction sensing hardware accessible via the operating system from which movements of the device can be sensed. Embodiments may also be configured to access at least one camera in communication with a mobile device, which in many cases includes at least one camera that is integrated with the device hardware. The camera can be configured to capture video and/or imagery, which can be accessed by the operating system and other software applications executed on the device.

Accordingly, embodiments of this disclosure can combine location and position data from the mobile device as well as video and/or imagery from the camera to display an augmented reality view of a golf course on which the golfer is located. In other words, embodiments can overlay information that may be helpful to a golfer over a view of the golf course that is captured by the camera and displayed a display associated with the device. In this way, a golfer can view information about the golf course from a first person perspective. Embodiments can overlay information about one or more position points (e.g., lay up positions, distance to a hole, etc.), hazards (e.g., a bunker, water hazard), or other points of interest on a golf course. When one (or more) of the predetermined distances is close to or in a hazard (such as a bunker or water hazard) or other undesirable location, that lay up distance may be disabled.

Similarly, some embodiments may be configured to receive and/or utilize dynamic lay up distances. The dynamic lay up distances may be user configurable for a particular hole, golfer, and/or golf course. Additionally, another non-limiting example may be configured to retrieve imagery of the golf course that can be used to generate a "telescope" and/or "fly-over" view of certain portions of the hole that are relative to the vantage point of the user. In other words, the application can utilize a plurality of different images (and/or video) of a particular golf hole (or portion of a golf hole) to provide a clear representation of the golf hole. As one example, the application can generate a view of a green, hazard, or other point of interest that may not be visible from the position of the golfer, but that shows the point of interest as if it is being viewed from a direction consistent with the golfer's position.

Referring now to the drawings, FIG. 1 illustrates an exemplary embodiment of a communications network, which may be configured to facilitate communication of data. More specifically, as illustrated in the non-limiting example of FIG. 1, a network 100 may be utilized and include a Wide Area Network (WAN), such as the Internet, a public switched telephone network (PSTN), mobile communications network (MCN) and/or other network. Similarly, the network 100 may include a wire line and/or a wireless local area network (LAN). Regardless of the communications medium and protocol, the network 100 may be coupled to one or more user devices 102a, 102b, 102c. The user devices 102a, 102b, 102c (collectively referred to as user device 102 or a mobile device 102) may include a personal computer, laptop, special purpose location device, and/or other device that is configured for communicating with the network 100. While the user devices 102a, 102b may be wire line devices, the mobile device 102c may be configured for wireless communications and be configured to communicate with the network 100 via an access point 104 or other wireless communications device.

Additionally included in the non-limiting example of FIG. 1, is the access point 104. The access point 104 may be configured as a wireless cellular tower, a wireless fidelity (Wi-Fi) hotspot, a worldwide interoperability for microwave access (WIMAX) tower, a cellular tower, and/or other wireless node. Also included in the non-limiting example of FIG. 1 is a server 106. The server 106 may be configured to facilitate the communication of data, such as golf course data, Internet data, email, instant messages, short message service (SMS) messages audio messages, video messages, and/or other electronic data.

Further included in the non-limiting example of FIG. 1, is a satellite network 108. More specifically, the satellite network 108 may include a global positioning system (GPS) satellite network or other satellite network that communicates data with the user devices 102 for facilitating a determination of position of those user devices. While the satellite network 108 is depicted in FIG. 1 as a single satellite, this is a non-limiting example, as the satellite network may include other satellites, computing devices, servers, networks, etc., depending on the particular configuration. Additionally, a user device 102 can determine its position based on other information as well, such as the location of access points 104 with which it can communicate, network based location techniques, and other location sensing systems and methods as can be appreciated.

Figure 2:
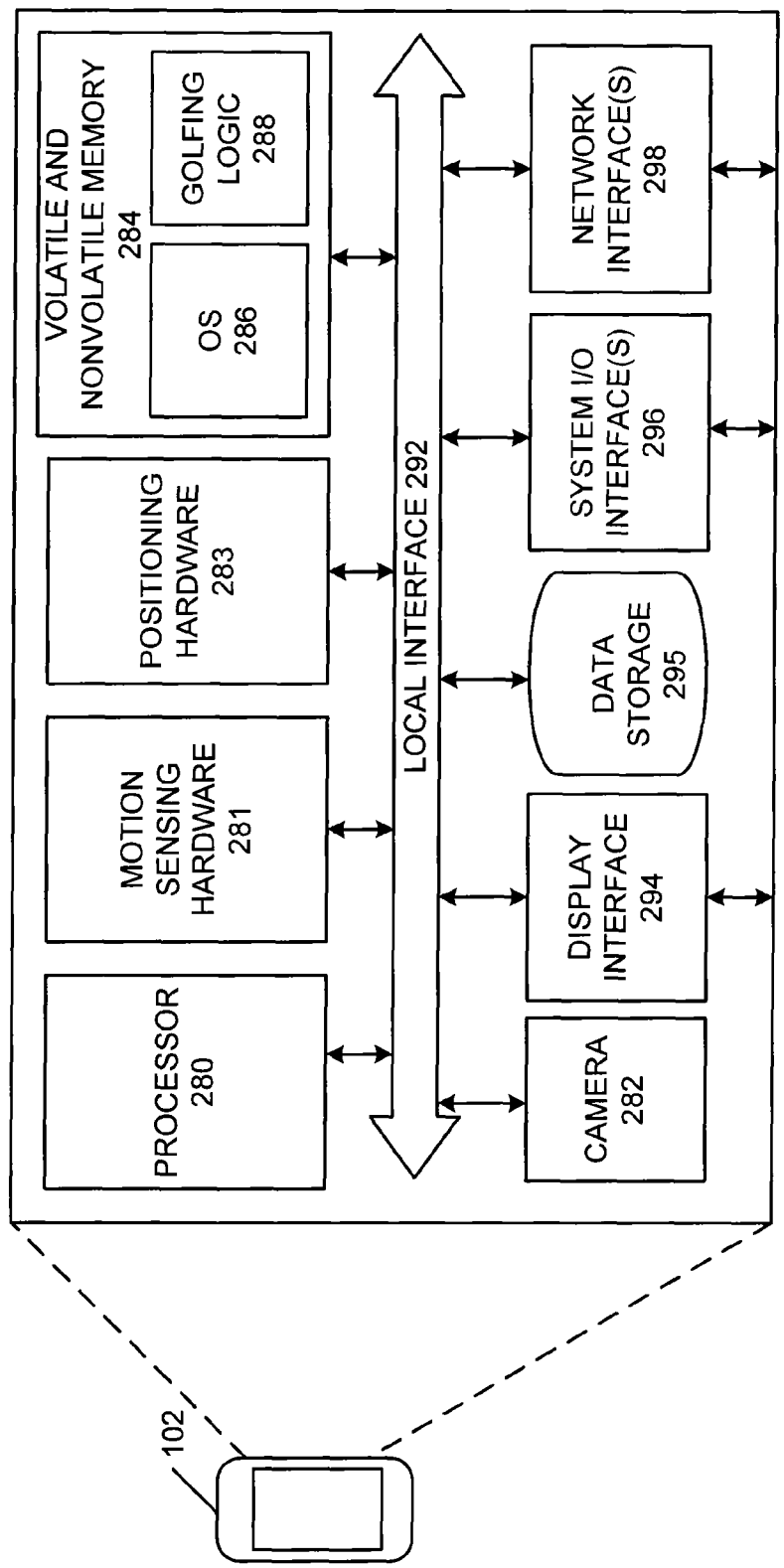
FIG. 2 is a drawing of a mobile device according to various embodiments of the present disclosure.

FIG. 2 illustrates an exemplary embodiment of a mobile device 102, which may be configured to provide options for uploading and/or downloading content, such as in the network from FIG. 1. Although a wireless device (e.g., the mobile device 102c) is illustrated, this discussion can be applied to wire line devices, as well. According to exemplary embodiments, in terms of hardware architecture, the mobile device 102 includes a processor 280, motion sending hardware 281, positioning hardware 283, a memory component 284, a display interface 294, data storage 295, one or more input and/or output (I/O) device interface(s) 296, and/or one or more network interfaces 298 that are communicatively coupled via a local interface 292. The local interface 292 can include, for example but not limited to, one or more buses and/or other wired or wireless connections. The local interface 292 may have additional elements, which are omitted for simplicity, such as controllers, buffers (caches), drivers, repeaters, and receivers to enable communications. Further, the local interface 292 may include address, control, and/or data connections to enable appropriate communications among the aforementioned components. The processor 280 may be a device for executing software, particularly software stored in the memory component 284. The processor 280 can include any custom made or commercially available processor, a central processing unit (CPU), an auxiliary processor among several processors associated with the mobile device 102, a semiconductor based microprocessor (in the form of a microchip or chip set), a macroprocessor, and/or generally any device for executing software instructions.

The motion sending hardware 281 can include one or more gyroscopes, accelerometers, compasses or other hardware components that can be used to detect motion of the device 102. Positioning hardware 283 can include satellite communications hardware that can communicate with one or more positioning satellites (e.g., GPS) to determine a geographic position of the device 102. The device 102 can also include a camera 282, which can capture video and/or imagery on which data regarding points of interest can be overlaid according to embodiments of this disclosure.

The memory component 284 can include any one or combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, the memory 284 may incorporate electronic, magnetic, optical, and/or other types of storage media. One should note that the memory 284 can have a distributed architecture (where various components are situated remote from one another), but can be accessed by the processor 280.

The software in the memory 284 may include one or more separate programs, which may include an ordered listing of executable instructions for implementing logical functions. In the example of FIG. 2, the software in the memory component 284 may include the golfing logic 288, as well as an operating system 286. The operating system 286 may be configured to control the execution of other computer programs and provides scheduling, input-output control, file and data management, memory management, and communication control and related services. The operating system 286 can also provide application programming interfaces (API) through which the various hardware components of the device 102 can be accessed. As one non-limiting example, the operating system 286 can provide a positioning API through which a software application executed on the device can request information about geographic positioning of the device. Similarly, the operating system 286 can also provide API's through which motion sensing data and camera video or imagery can be accessed as well.

The golfing logic 288 may be configured to facilitate processing of motion data, as determined by the motion sensing hardware 281, positioning data, as determined by positioning hardware 283 and combine this with golf course data, user data, and/or other data that can be locally stored or retrieved from a server 106. The golfing logic 288 can overlay various data regarding a golf course on which a user of a device 102 may be located atop imagery and/or video captured by the camera 282. In other words, the golfing logic 288 can generate a user interface that can be displayed on a display device in communication with the device.

A system component and/or module embodied as software may also be construed as a source program, executable program (object code), script, or any other entity comprising a set of instructions to be performed. When constructed as a source program, the program is translated via a compiler, assembler, interpreter, or the like, which may or may not be included within the memory component 284, so as to operate properly in connection with the operating system 286.

In addition to the camera 282, which is described above, the input/output devices that may be coupled to the system I/O Interface(s) 296 may include input devices, for example but not limited to, a keyboard, mouse, touch screen, microphone, etc. Further, the input/output devices may also include output devices, for example but not limited to, a printer, display, speaker, etc. Further, the input/output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc. It should be appreciated that the camera 282 can be configured to communicate with the rest of the device 102 components via the system I/O interface(s) 296, and that the depicted illustration is a non-limiting example presented for ease of explanation of embodiments of the disclosure.

Additionally included are one or more of the network interfaces 298 for facilitating communication with one or more other devices. More specifically, network interface 298 may include any component configured to facilitate a connection with another device. When the mobile device 102 is in operation, the processor 280 may be configured to execute software stored within the memory component 284, to communicate data to and from the memory component 284, and to generally control operations of the mobile device 102 pursuant to the software. Software in the memory component 284, in whole or in part, may be read by the processor 280, perhaps buffered within the processor 280, and then executed.

One should note that while the description with respect to FIG. 2 includes the mobile device 102 as a single component, this is a non-limiting example. More specifically, in at least one embodiment, the mobile device 102 can include a plurality of servers, personal computers, telephones, and/or other devices. Similarly, while the description of FIG. 2 describes the mobile device 102 as a mobile device, this is also a non-limiting example. More specifically, depending on the particular exemplary embodiment, other components, such as the server 106 and/or the access point 104 may include similar elements and/or logic. Similarly, while the golfing logic may be configured in FIG. 2 with the mobile device, the golfing logic 288 may take one or more different forms, depending on the particular configuration. More specifically, as referred to herein, the golfing logic 288 may include a user implemented piece(s) of logic for receiving geographic data for a golf course. However, some embodiments refer to the golfing logic 288 as a technician implemented piece(s) of logic for mapping and/or otherwise configuring data for the user application.

Additionally, while the golfing logic 288 is illustrated in FIG. 2 as including a single software component, this is also a non-limiting example. In at least one embodiment, the golfing logic 288 may include one or more components, embodied in software, hardware, and/or firmware. Additionally, while the golfing logic 288 is depicted as residing on a single device, such as mobile device 102, the golfing logic 288 may include one or more components residing on one or more different devices.

One should also note that while the non-limiting example of FIG. 2 illustrates a mobile device 102, similar hardware and/or software may be associated with the server 106. More specifically, the server 106 may include one or more processor, memory component, etc., as well as logic for processing and/or providing data to the mobile device 102.

Figure 3:
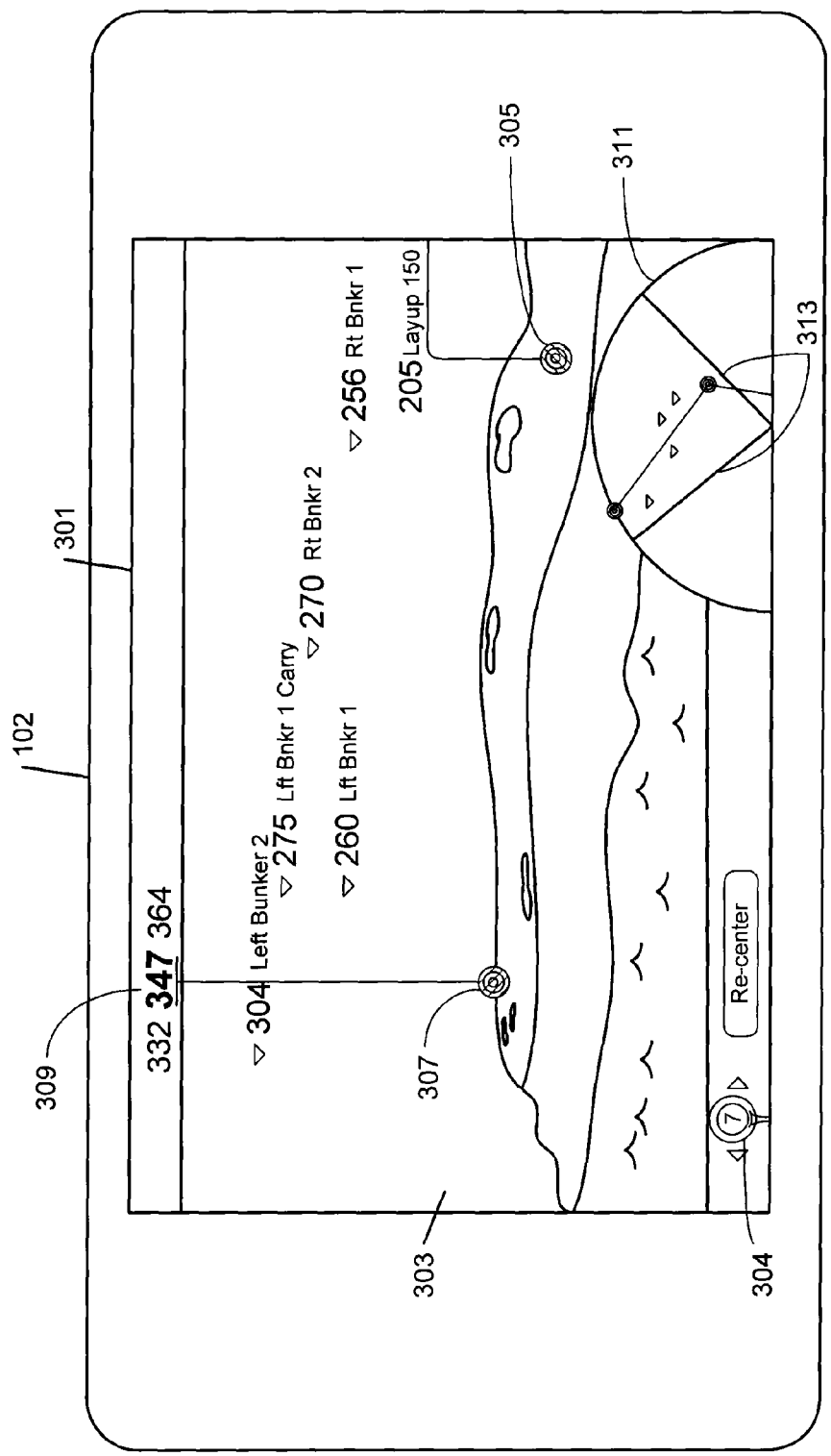
FIG. 3 is a drawing of an example of a user interface rendered by a mobile device of FIG. 2 according to various embodiments of the present disclosure.

Accordingly, reference is now made to FIG. 3, which one example of a user interface 301 generated by the golfing logic 288, or any embodiment of this disclosure, and displayed on a mobile device 102. The depicted user interface 301 shows video 303 and/or imagery that can be taken from a camera 282 in communication with a mobile device 102. In the depicted embodiment, the camera 282 can be integrated in the hardware of the mobile device 102 on a side of the device opposing the display device. Accordingly, the video 303 captured by the camera 282 can be similar to a view that the user sees when standing on a golf course. The mobile device 102 can access the positioning hardware 283 and/or motion sending hardware 281 to determine a geographic position of the mobile device 102, and the golfing logic 288 can determine whether the mobile device 102 is positioned on a golf course for which point of interest data is available.

As described above, point of interest data regarding a golf course can include lay-up positions, hazard data, hole location data, distance to various portions of a green, bunker position, and other point of interest data as can be appreciated. If the golfing logic 288 determines that the mobile device 102 is positioned on a golf course for which point of interest data is available, it can detect which hole on the golf course on which the mobile device is positioned. Upon detecting the hole of the golf course on which the mobile device 102 is positioned, the golfing logic 288 can display a hole indicator 304 as well as display the video 303 captured by the camera 282 as well as overlay point of interest data related to the hole on the user interface 301 to generate an augmented reality view of the golf course from the vantage point of the user.

Because the location of the mobile device 102 can be ascertained from the motion sensing hardware 281 and positioning hardware 283, the golfing logic 288 can calculate the distance to various points of interest of the hole and overlay distance markers or indicators on the video 303. The golfing logic 288 can update the displayed video 303 as well as the displayed markers as the mobile device 102 moves to provide a substantially real time view of the golf course as it is viewed from the camera 282. The golfing logic 288 can rely on the motion sensing hardware 281 to detect small movements of the mobile device 102 (e.g., slight movements of the user's hands when holding the device 102) and rely on the positioning hardware 283 to detect a change of location on the golf course. By tracking the location and motions of the mobile device 102 in this way, the golfing logic 288 can continually update the yardage markers reflected on the displayed video 303.

Returning again to the depicted user interface 301, shown are various yardage indicators overlaid onto the video 303 captured by the camera 282 that represent points of interest on a golf course. In the depicted example, the golfing logic 288 can either calculate a layup marker 305 or retrieve data about where a layup marker 305 should be positioned from a server or locally stored data about the golf course. In the example of FIG. 3, a layup marker 305 showing a position on the golf course that is one hundred fifty yards from the green can be shown on its position the video 303 in the display. The golfing logic 288 can either select a point in a fairway that is one hundred fifty yards from the green, or rely on one or more predetermined layup positions, and place markers showing these predetermined layup positions in the user interface 301. Additionally, the golfing logic that display a green position marker 307 that designates a location of the green associated with the hole on which the user is located. The green yardage indicator 309 can display a distance to various portions of the green (e.g., front, middle, back, etc.).

The golfing logic 288 can also overlay the various point of interest data on the video 303 in a way that provides an additional visual as to the distance from the location of the mobile device 102 to the point of interest. As illustrated in the example of FIG. 3 (which is not drawn to scale), the various points of interest are rendered on the display in a way that illustrates the relative distance of each point of interest from the location of the mobile device 102. For example, the text associated with the layup marker 305 is rendered below the marker and/or text associated with the "right bunker 1," because in the depicted example, the right bunker 1 is located further away from the mobile device 102 than the one hundred fifty yard layup position. Likewise, the marker and/or text associated with the right bunker 1 is rendered above a horizontal position on the video 303 of the bunker. Additionally, the marker and/or text associated with the right bunker 2 is rendered above a horizontal position in the video 303 associated with the bunker, but the same is also rendered at a higher vertical position on the screen relative to the marker and text associated with right bunker 1.

The user interface 301 also includes a radar simulation view 311 of the points of interest of the hole. The radar simulation view 311 shows a "bird's eye" view of the position of the points of interest relative to one another. The radar simulation view 311 can also display a suggested course of action for the golfer. In other words, the radar simulation view 311 can display a suggested sequence of shots for the golfer to reach the green in a recommended number of strokes. The radar simulation view 311 can also display field of view indicators 313 that show the visible field of view displayed in the user interface 301 in terms of angular degrees, or a rough measure of a visible field of view in terms of a portion of a circle and/or ellipse.

Figure 4:
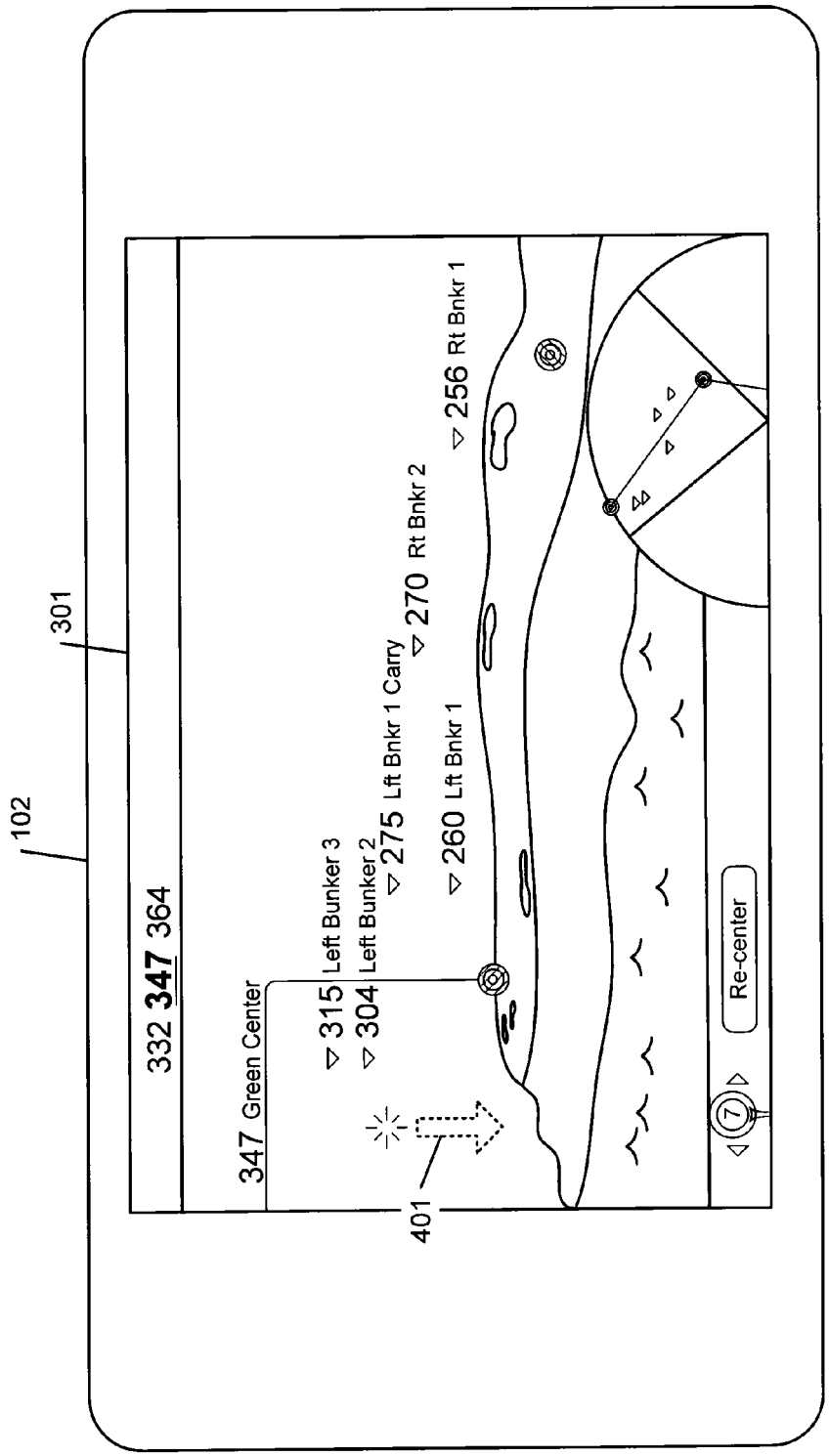
FIG. 4 is a drawing of an example of a user interface rendered by a mobile device of FIG. 2 according to various embodiments of the present disclosure.

Reference is now made to FIG. 4, which continues the example of FIG. 3. FIG. 4 illustrates indicators or markers that are scrollable. In the depicted example, if a user of the mobile device 102 scrolls the user interface by providing input via an input device (e.g., a touch screen) as shown by the depicted swipe gesture 401, the point of interest markers or indicators can shift in the direction of the user input while maintaining their relative orientations to one another. Additionally, the user interface, as it scrolls, can reveal additional markers or indicators for which there was not enough room within the user interface 301 to display in the example of FIG. 3. In some embodiments, the indicators can scroll automatically while maintaining their relative orientation to one another (indicating relative distance from a position of the mobile device).

Figure 5A:
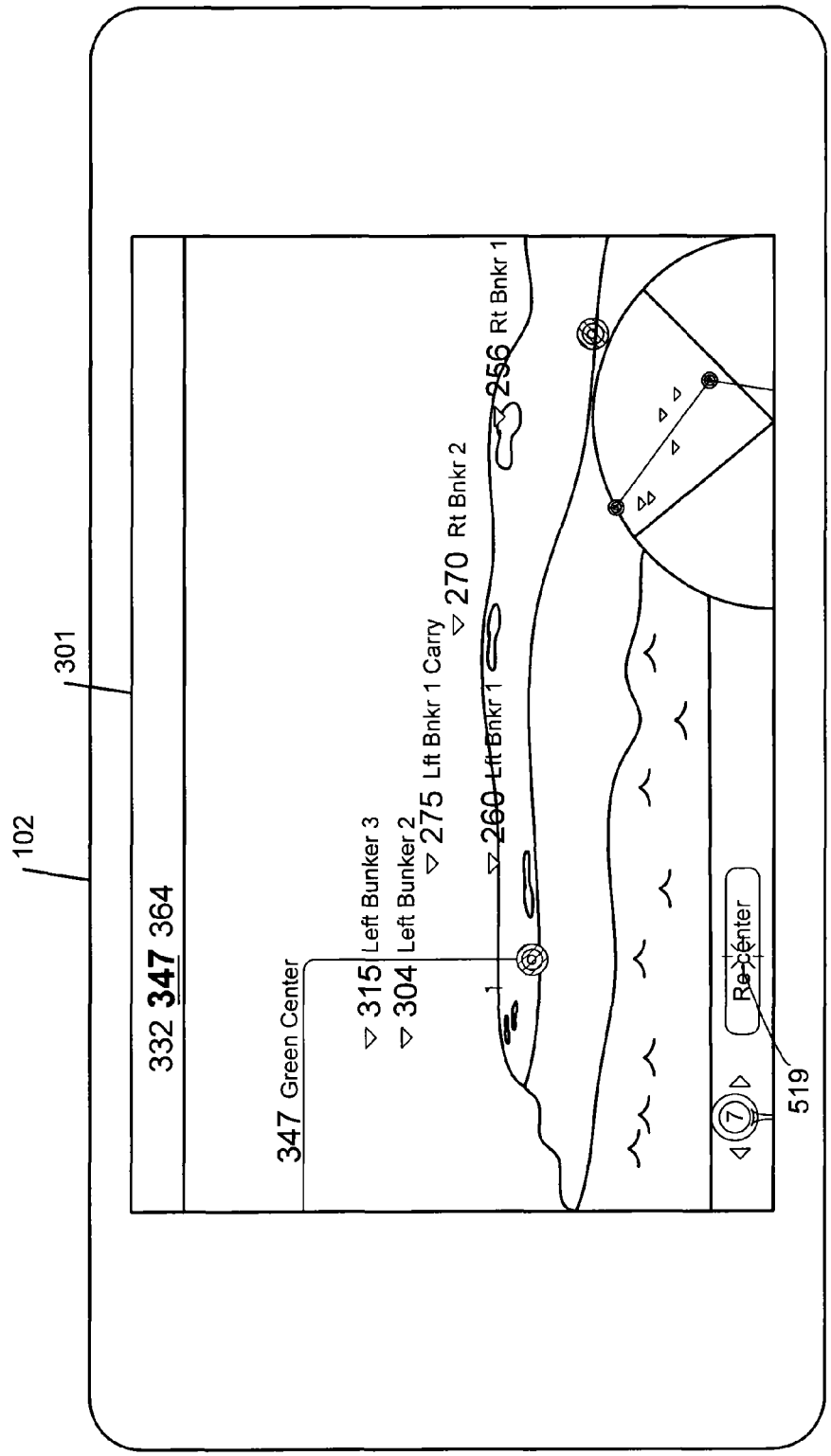
FIG. 5A is a drawing of an example of a user interface rendered by a mobile device of FIG. 2 according to various embodiments of the present disclosure.

Continuing the example of FIG. 4, reference is now made to FIG. 5A, which depicts an alternative illustration of the user interface 301 of FIGS. 3-4. In the example of FIG. 5A, the user interface 301 is depicted as having a degree of position error relative to the actual positions of points of interest on the golf course. It should be appreciated that the granularity and/or accuracy of the positioning hardware 283 and the motion sensing hardware 281 may be less than ideal, introducing a position error to the overlaid markers or indicators. Accordingly, a user can activate the "re-center" user interface element 519, which can allow the user to reorient or recalibrate the video 303 captured by the camera with the overlaid markers.

Figure 5B:
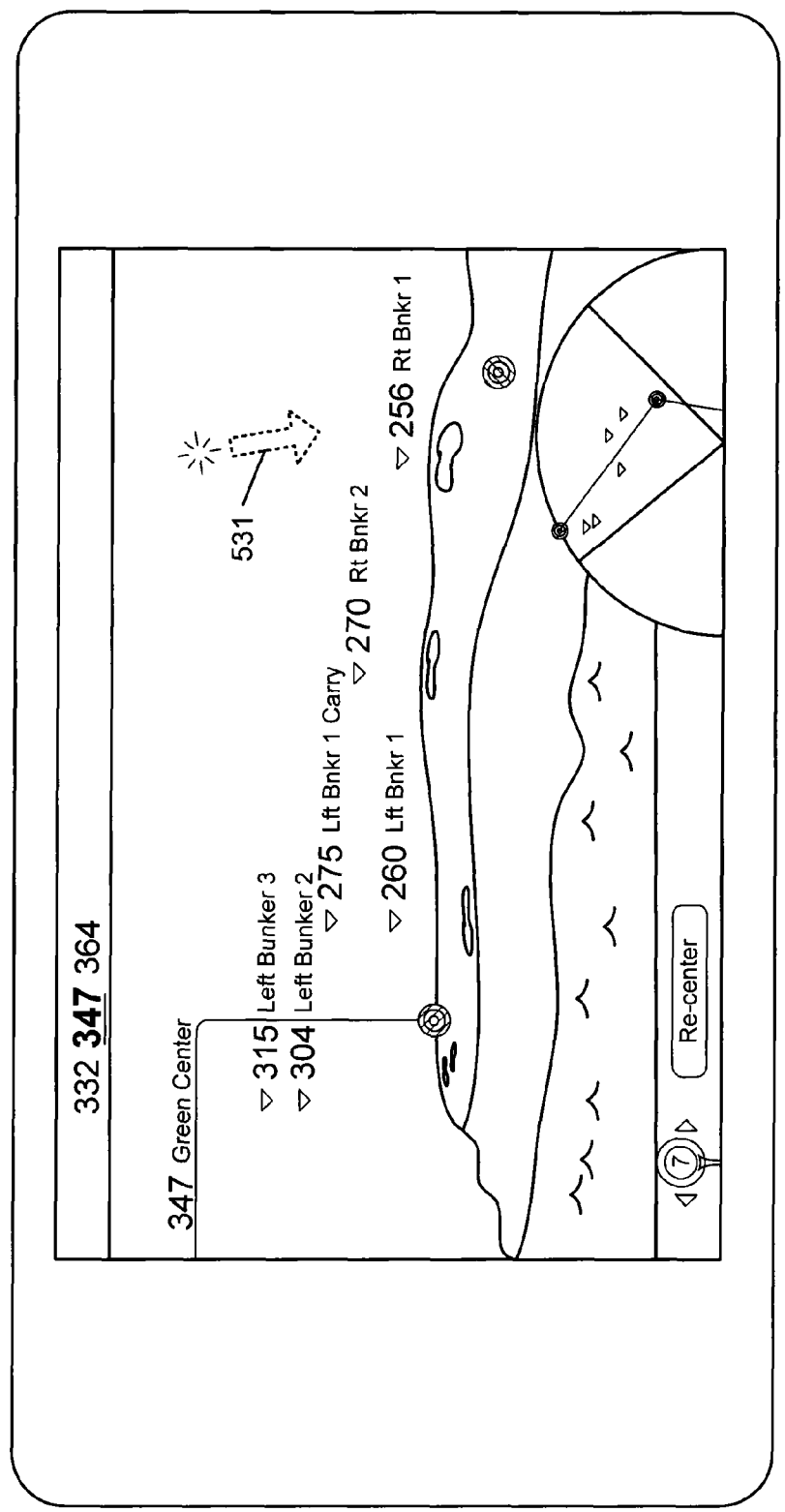
FIG. 5B is a drawing of an example of a user interface rendered by a mobile device of FIG. 2 according to various embodiments of the present disclosure.

Accordingly, reference is now made to FIG. 5B, which continues the example of FIG. 5A. In FIG. 5B, a user has activated a "re-center" user interface element 519 to correct a position error exhibited in the overlaid markers or indicators on the video 303. Accordingly, a user can provide input via a touch screen or other input device to reposition the video 303 and/or the indicators. In the depicted example, the user can input the depicted swipe gesture 531 on a touch screen input device to compensate for the position error.

The golfing logic 288 can, thereafter, compensate for the position error of the positioning hardware 283 by storing a degree of the position error that can be inferred from the adjustment made by the user to "re-center" the user interface. The golfing logic 288 can rely upon the stored position error to compensate for the placing of markers or indicators on video 303 captured by the camera 282 for the remainder of the hole, the round of golf, or any other period of time. In some embodiments, the golfing logic 288 can, if the user "re-centers" the user interface 301, rely only on the motion sensing hardware 281 to calculate a relative degree of movement from a position of the device 120 associated with the time the user invokes the re-centering process. In this way, the golfing logic 288 can be tuned to assume, if the user invokes re-centering, that the position reported by the positioning hardware 283 is flawed, and rely only on the motion of the device sensed by the motion sensing hardware 281 from that point onwards.

Figure 6:
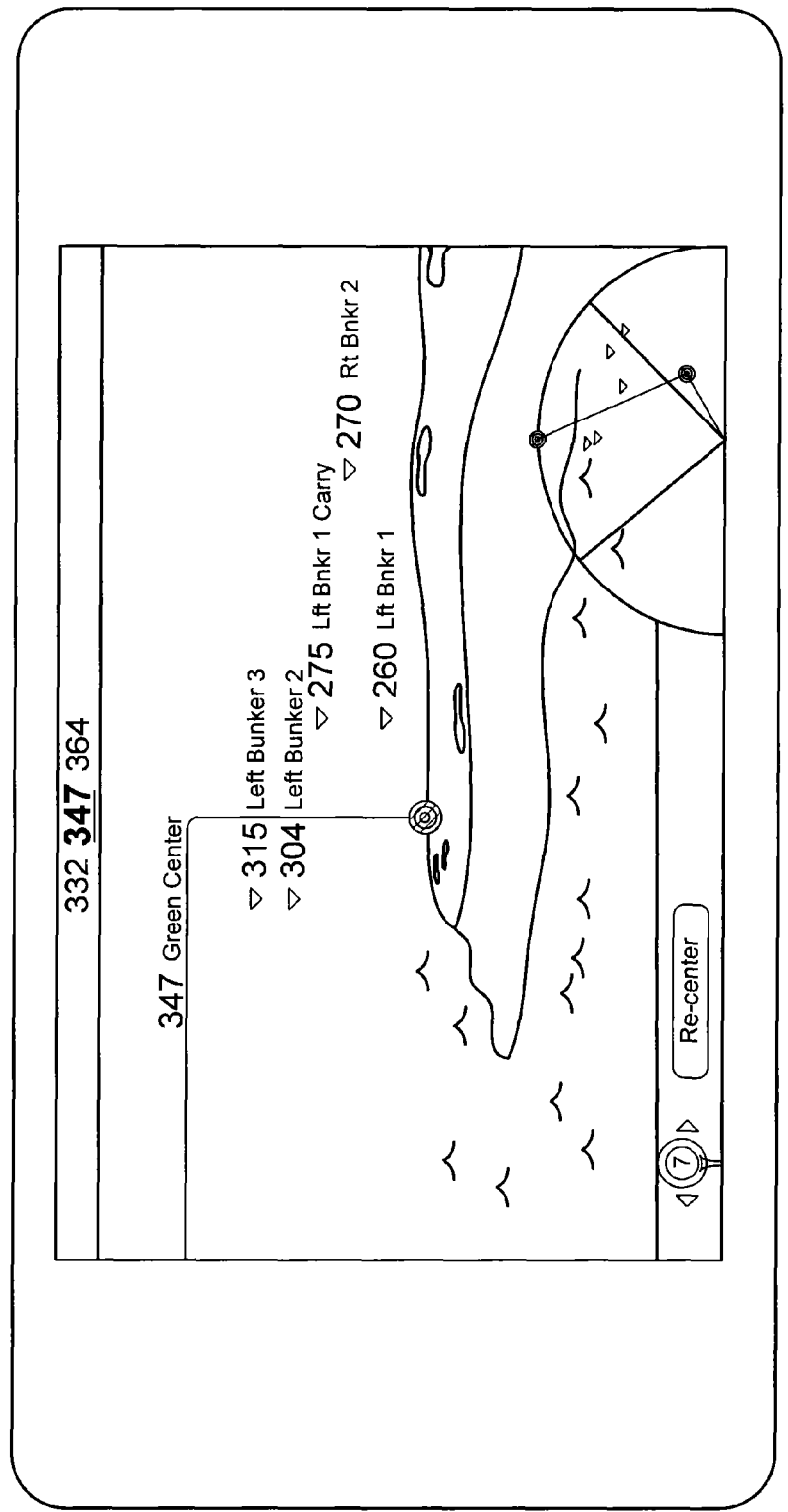
FIG. 6 is a drawing of an example of a user interface rendered by a mobile device of FIG. 2 according to various embodiments of the present disclosure.

Reference is now made to FIG. 6, which continues the examples of FIGS. 3-4. FIG. 6 illustrates how the user interface 301 can be updated substantially in real time as the golfing logic 288 detects movements of the orientation and/or position of the device 120. In the depicted example, the device 120 has been rotated, causing certain points of interest to lie outside the field of view of the camera 282. Additionally, the golfing logic 288 updates the horizontal position of the indicators above their associated point of interest on the video 303 of the golf course captured by the camera 282 as the device is rotated and/or moved by the user.

Figure 7:
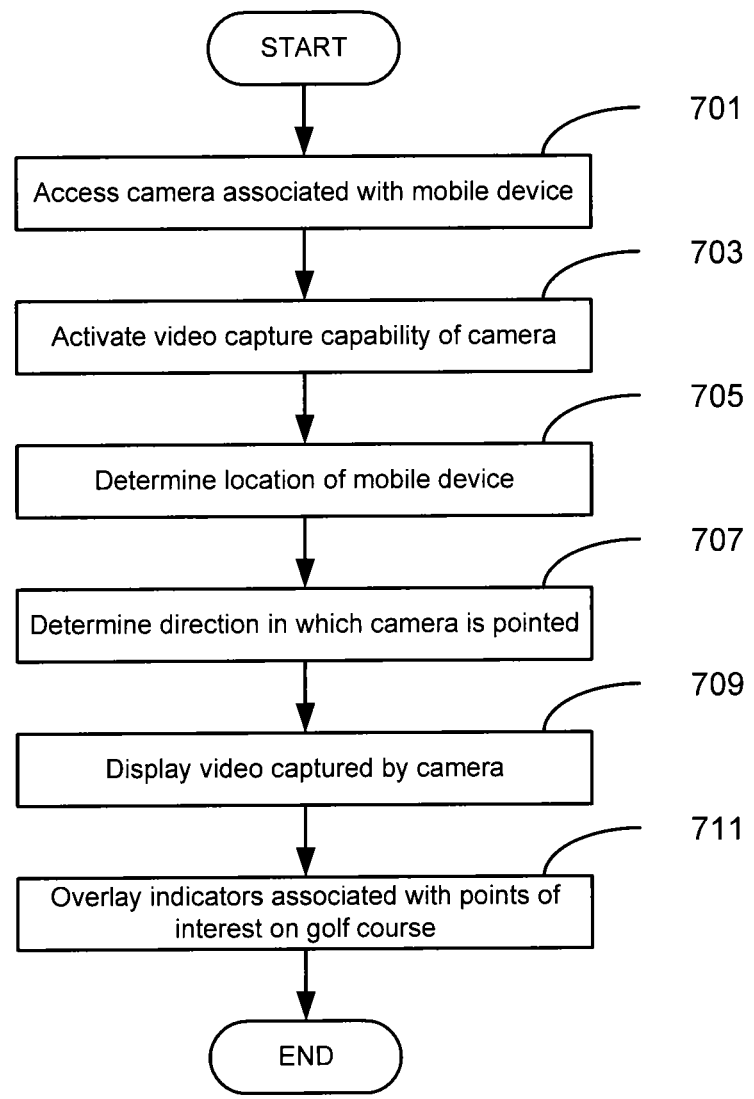
FIG. 7 is a flowchart illustrating one example of functionality implemented as portions of the golfing logic executed in a mobile device of FIG. 2 according to various embodiments of the present disclosure.

Referring next to FIG. 7, shown is a flowchart that provides one example of the operation of a portion of the golfing logic 288 according to various embodiments. It is understood that the flowchart of FIG. 7 provides merely an example of the many different types of functional arrangements that may be employed to implement the operation of the portion of the golfing logic 288 as described herein. As an alternative, the flowchart of FIG. 7 may be viewed as depicting an example of steps of a method implemented in a user device 120 (FIG. 1) according to one or more embodiments.

To begin, in box 701, the golfing logic 288 can access a camera associated with a mobile device 120. In box 703, video capture capability of the camera can be activated so that video can be displayed on a display associated with the mobile device. In box 705, the golfing logic can determine a location associated with the mobile device 120. As described above, the golfing logic 288 can access positioning hardware 283 and/or motion sensing hardware 281 associated with a mobile device 102. In box 707, the golfing logic 288 can determine an orientation of the mobile device 102. In other words, the golfing logic 288 can determine a direction in which the camera is pointed. In box 709, the golfing logic 288 can display video captured by the camera in a user interface, and in box 711, the golfing logic 288 can overlay points of interest associated with a golf course on the video show in the user interface.

Although the golfing logic 288, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 7 shows the functionality and operation of an implementation of portions of the golfing logic 288. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a user device or mobile device. The machine code may be converted from the source code, etc. If embodied in hardware, each block may represent a circuit or a number of interconnected circuits to implement the specified logical function(s).

Although the flowchart of FIG. 7 shows a specific order of execution, it is understood that the order of execution may differ from that which is depicted. For example, the order of execution of two or more blocks may be scrambled relative to the order shown. Also, two or more blocks shown in succession in FIG. 7 may be executed concurrently or with partial concurrence. Further, in some embodiments, one or more of the blocks shown in FIG. 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including golfing logic 288, that comprises software or code can be embodied in any non-transitory computer-readable medium for use by or in connection with an instruction execution system such as, for example, a processor in a computer system, user device, mobile device, or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a mobile device, the program comprising:
    logic that accesses, in the mobile device, a camera in communication with the mobile device;
    logic that activates, in the mobile device, at least one video capture capability of the camera;
    logic that determines, in the mobile device, a location associated with the mobile device;
    logic that determines, in the mobile device, a direction in which the camera is pointed;
    logic that displays, in a display associated with the mobile device, video captured by the camera in a user interface;
    logic that overlays, in the mobile device, a first indicator associated with a first predetermined point of interest on the video in the user interface, the first indicator comprising a distance indicator corresponding to a distance from the location associated with the mobile device to the at least one first predetermined point of interest and a position of the first indicator on the video is based at least in part on the direction in which the camera is pointed;
    and
    logic that overlays, in the mobile device, a second indicator associated with a second predetermined point of interest on the video in the user interface, the second indicator comprising a second distance indicator corresponding to a distance from a location associated with the first predetermined point of interest to the second predetermined point of interest;
    wherein the logic that overlays the first indicator and the logic that overlays the second indicator are configured to display the first and second indicators on the display of the mobile device simultaneously with the video from the camera.

2. The non-transitory computer-readable medium of claim 1, further comprising:
    logic that detects, in the mobile device, motion associated with the mobile device;

logic that updates, in the mobile device, the location associated with the mobile device and the direction in which the camera is pointed;

logic that updates, in the mobile device, the display of the video captured by the camera based at least upon the updated location associated with the mobile device and direction in which the camera is pointed; and logic that updates, in the mobile device, the first indicator associated with the first predetermined point of interest and the second indicator associated with the second predetermined point of interest.

3. The non-transitory computer-readable medium of claim 2, wherein the logic that detects motion associated with the mobile device further comprises receiving at least one of: a direction from a compass in communication with the mobile device, acceleration data from at least one accelerometer in communication with the mobile device, and orientation data from at least one gyroscope in communication with the mobile device.

4. The non-transitory computer-readable medium of claim 1,
wherein the logic that overlays the first indicator associated with the first predetermined point of interest further comprises:
logic that determines, in the mobile device, a first direction of the first predetermined point of interest, the first direction being determined relative to the direction in which the camera is pointed;
logic that renders, on the display in communication with the mobile device, the first indicator in a position on the display corresponding to the first direction relative to the direction in which the camera is pointed.

5. The non-transitory computer-readable medium of claim 4, wherein the first indicator is placed above a location of a respective point of interest in the video.

6. The non-transitory computer-readable medium of claim 5, wherein an indicator user interface element is scrollable to allow a plurality of indicators to be viewable in the indicator user interface element.

7. The non-transitory computer-readable medium of claim 4, wherein at least a portion of the first indicator is placed in an indicator user interface element, the indicator user interface element being rendered in an upper portion of the user interface.

8. The non-transitory computer-readable medium of claim 7, further comprising:
logic that sorts a list of predetermined points of interest, including the at least one first predetermined point of interest, by distance from the location associated with the mobile device;
logic that renders a first subset of a list of indicators, including the first indicator corresponding the first predetermined points of interest, closest to the location associated with the mobile device in the indicator user interface element; and
logic that scrolls the indicator user interface element to render a second subset of the list of indicators.

9. The non-transitory computer-readable medium of claim 1, further comprising logic that encodes for display on the display in communication with the mobile device a position error correction user interface, the position error correction user interface comprising at least one user interface element facilitating reorientation of the direction in which the camera is pointed.

10. The non-transitory computer-readable medium of claim 1, wherein the logic that detects the direction in which the camera is pointed further comprises requesting a device direction from a motion sensing application programming interface (API).

11. A method of overlaying data in an augmented reality user interface in a mobile device, comprising steps of:
accessing a camera in communication with the mobile device;
activating at least one video capture capability of the camera;
determining a location associated with the mobile device;
determining a direction in which the camera is pointed;
displaying, in a display associated with the mobile device, video captured by the camera in a user interface;
overlaying a first indicator associated with a first predetermined point of interest on the video in the user interface, the first indicator comprising at least one distance indicator corresponding to a distance from the location associated with the mobile device to the first predetermined point of interest and a position of the first indicator on the video is based at least in part on the direction in which the camera is pointed;
overlaying a second indicator associated with a second predetermined point of interest on the video in the user interface, the second indicator comprising a second distance indicator corresponding to a distance from a location associated with the first predetermined point of interest to the second predetermined point of interest; and
determining whether the second distance indicator fails to meet a predetermined threshold, the predetermined threshold corresponding to a distance to an undesired location;
wherein the first indicator and the second indicator are simultaneously displayed on the video from the camera.

12. The method of claim 11, further comprising:
detecting motion associated with the mobile device;
updating the location associated with the mobile device and the direction in which the camera is pointed;
updating the display of the video captured by the camera based at least upon the updated location associated with the mobile device and direction in which the camera is pointed;
updating the first indicator associated with the at least one first predetermined point of interest; and
updating the second indicator associated with the second predetermined point of interest.

13. The method of claim 12, wherein detecting motion associated with the mobile device further comprises receiving at least one of:
a direction from a compass in communication with the mobile device, acceleration data from at least one accelerometer in communication with the mobile device, and orientation data from at least one gyroscope in communication with the mobile device.

14. The method of claim 11, wherein overlaying the first indicator associated with the first predetermined point of interest further comprises:
determining a first direction of the first predetermined point of interest, the first direction being determined relative to the direction in which the camera is pointed;
rendering, on the display associated with the mobile device, the first indicator in a position on the display corresponding to the first direction relative to the direction in which the camera is pointed.

15. The method of claim 14, wherein the first indicator is placed above a location of a respective point of interest in the video.

16. The method of claim 14, further comprising:
sorting a list of points of interests, including the first point of interest, by distance from the location associated with the mobile device;
rendering a first subset of a list of indicators, including the first indicator corresponding the point of interest, that are closest to the location associated with the mobile device in the indicator user interface element; and
scrolling the indicator user interface element to render a second subset of the list of indicators.

17. The method of claim 11, further comprising encoding for display on the display in communication with the mobile device a direction correction user interface, the direction correction user interface comprising at least one user interface element reorient the direction in which the camera is pointed.

18. The method of claim 11, wherein detecting the direction in which the camera is pointed further comprises requesting a device direction from a direction application programming interface (API).

* * * * *